(12) United States Patent
Johnson (10) Patent No.: US 12,433,434 B1
(45) Date of Patent: Oct. 7, 2025

(54) ESPRESSO MUG DEVICE

(71) Applicant: Claudia Johnson, Chula Vista, CA (US)

(72) Inventor: Claudia Johnson, Chula Vista, CA (US)

( * ) Notice: Subject to any disclaimer, the term of this patent is extended or adjusted under 35 U.S.C. 154(b) by 0 days.

(21) Appl. No.: 18/672,219

(22) Filed: May 23, 2024

(51) Int. Cl.
*A47G 19/22* (2006.01)

(52) U.S. Cl.
CPC ..... *A47G 19/2272* (2013.01); *A47G 19/2288* (2013.01)

(58) Field of Classification Search
CPC ............... A47G 19/2205; A47G 19/22; A47G 19/2266; A47G 19/2272; A47G 19/2288
USPC ...................................... 220/254.3
See application file for complete search history.

(56) References Cited

U.S. PATENT DOCUMENTS

| | | | |
|---|---|---|---|
| 4,186,842 A | 2/1980 | Albert | |
| 5,143,248 A | 9/1992 | Sawatsky | |
| 5,570,797 A | 11/1996 | Yeh | |
| D382,174 S | 8/1997 | Grimm | |
| 6,102,244 A * | 8/2000 | Kuwano | A47G 19/2272 220/711 |
| 6,659,302 B2 * | 12/2003 | Lin | A47G 19/2272 222/509 |
| 10,252,838 B2 * | 4/2019 | Ban | A47G 19/2272 |
| 11,718,455 B2 * | 8/2023 | Jinkins | B65D 53/02 220/254.9 |
| 2001/0036124 A1 * | 11/2001 | Rubenstein | A47J 43/042 366/205 |

FOREIGN PATENT DOCUMENTS

CA          2044477          7/1993

* cited by examiner

*Primary Examiner* — Javier A Pagan (57) ABSTRACT

An espresso mug device for holding and transporting espresso shots includes a mug with a base wall and a peripheral wall that is coupled to and extends upwardly from the base wall to define an inner volume. An open top side provides access to the inner volume. A rim extends around the open top side. A lid with an upper plate and a lip is removably positionable over the open top side to selectively inhibit access to the inner volume. A mug gasket is coupled to the rim. A lid gasket is coupled to the lip of the lid. The mug gasket and the lid gasket each include a rubber material wherein the mug gasket and the lid gasket are designed to seal a junction between the mug and the lid to inhibit airflow into the inner volume and to insulate contents of the mug from outside temperatures.

17 Claims, 6 Drawing Sheets

ESPRESSO MUG DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to travel mugs and more particularly pertains to a new travel mug for holding and transporting espresso shots.

(2) Description of Related Art Including Information Disclosed Under 37 CFR 1.97 and 1.98

The prior art relates to travel mugs. Travel mugs are often used to hold and transport beverages. For example, some travel mugs are thermally insulated so that the contents of the travel mugs are insulated from outside temperatures. Users may put coffee, hot tea, or other beverages into the travel mugs so that the users can enjoy their beverages on the go. Accordingly, many travel mugs are made to hold volumes of 12 fluid ounces or more. However, if a user prefers espresso shots to coffee or hot tea, the 12 fluid ounce volume can be too large. Thus, there is a need for a travel mug that is designed to hold espresso shots.

BRIEF SUMMARY OF THE INVENTION

An embodiment of the disclosure meets the needs presented above by generally comprising a mug with a base wall and a peripheral wall that is coupled to and extends upwardly from the base wall to define an inner volume. The mug has an open top side to provide access to the inner volume. A rim is coupled to the peripheral wall distally to the base wall. The rim extends around the open top side. A lid includes an upper plate and a lip that is coupled to and extends downwardly from the upper plate. The lid is removably positionable over the open top side of the mug to selectively inhibit access to the inner volume wherein the lip is positionable around the rim. A mug gasket is coupled to the rim. A lid gasket is coupled to the lid. The mug gasket and the lid gasket each comprise a rubber material wherein the mug gasket and the lid gasket are configured to seal a junction between the mug and the lid to inhibit airflow into the inner volume and to insulate contents of the mug from outside temperatures.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 6 thereof, a new travel mug embodying the principles and concepts of an embodiment of the disclosure and generally designated by the reference numeral 10 will be described.

As best illustrated in FIGS. 1 through 6, the espresso mug device 10 generally comprises a mug 12. The mug 12 generally has a base wall 14 and a peripheral wall 16 that is coupled to and extends upwardly from the base wall 14 to define an inner volume 18. The mug 12 generally has an open top side 20 to provide access to the inner volume 18. The inner volume 18 may be between 2.5 fluid ounces and 10.0 fluid ounces wherein the mug 12 is configured to hold a plurality of espresso shots. For example, the plurality of espresso shots may include between 1.0 and 6.0 espresso shots, which typically have a volume between 1.5 fluid ounces and 9.0 fluid ounces. The inner volume 18 may be between 2.5 fluid ounces and 10.0 fluid ounces such that the mug 12 is further configured to hold a volume of creamer that is added to the plurality of espresso shots.

A rim 22 may be coupled to the peripheral wall 16 distally to the base wall 14. The rim 22 may extend around the open top side 20. For example, the peripheral wall 16 may be curved outwardly approaching the rim 22 wherein the open top side 20 is enlarged to facilitate access into the inner volume 18.

A handle 24 may be coupled to the peripheral wall 16 of the mug 12. The handle 24 is generally configured to facilitate the mug 12 in being held. The handle 24 may extend outwardly from the peripheral wall 16. The handle 24 may be positioned proximate to the rim 22.

A lid 26 generally comprises an upper plate 28 and a lip 30 that is coupled to and extends downwardly from the upper plate 28. The lid 26 is removably positionable over the open top side 20 of the mug 12 to selectively inhibit access to the inner volume 18. The lip 30 may be positionable around the rim 22. The upper plate 28 and the lip 30 may comprise a resiliently deformable material wherein the lid 26 is configured to be upwardly bendable to facilitate removal of the lid 26 from the mug 12.

An air vent 34 may extend through the upper plate 28 wherein the air vent 34 is configured to facilitate airflow out of the inner volume 18 when the air vent 34 is uncovered. For example, the air vent 34 may be positioned proximate to the lip 30.

A cover 36 may be pivotably coupled to the upper plate 28. The cover 36 is positioned proximate to the air vent 34. The cover 36 may be upwardly pivotable from the upper plate 28 to uncover 36 the air vent 34. The cover 36 may be downwardly pivotable toward the upper plate 28 to close the air vent 34 to inhibit airflow out of the inner volume 18.

The cover 36 may include a plug 38 that is coupled to and extends downwardly from the cover 36. The plug 38 may be alignable with the air vent 34. More specifically, the plug 38 is positionable within the air vent 34 wherein the plug 38 is configured to inhibit contents of the mug 12 from leaking out of the air vent 34 when the cover 36 is pivoted downwardly to close the air vent 34.

A clip 48 may be pivotably coupled to the upper plate 28 of the lid 26. The clip 48 may be downwardly pivotable to engage the rim 22 wherein the clip 48 secures the lid 26 to the mug 12. The user may pivot the clip 48 upwardly to release the rim 22 and remove the lid 26 from the mug 12.

Figure 1:
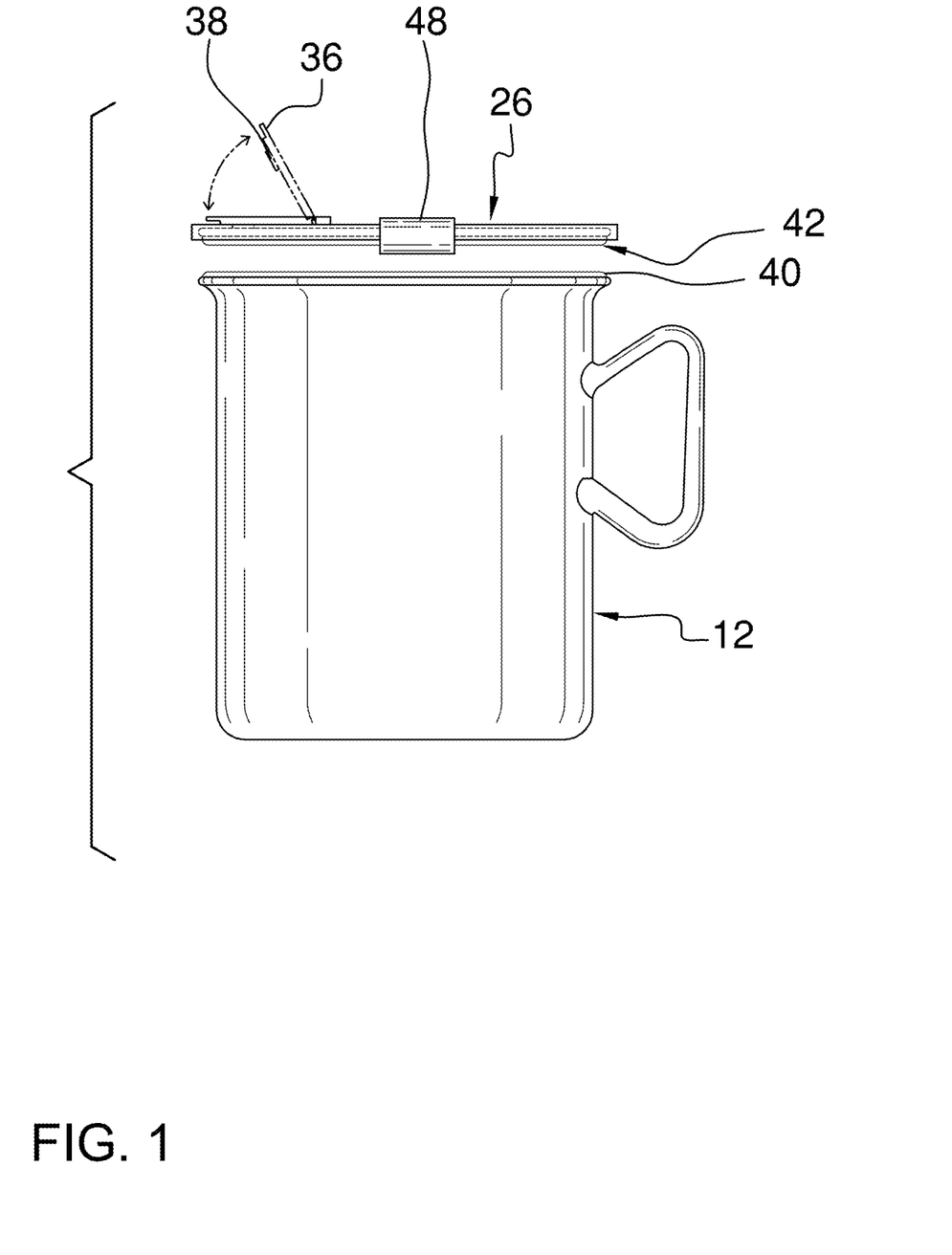
FIG. 1 is a front view of an espresso mug device according to an embodiment of the disclosure.
Figure 2:
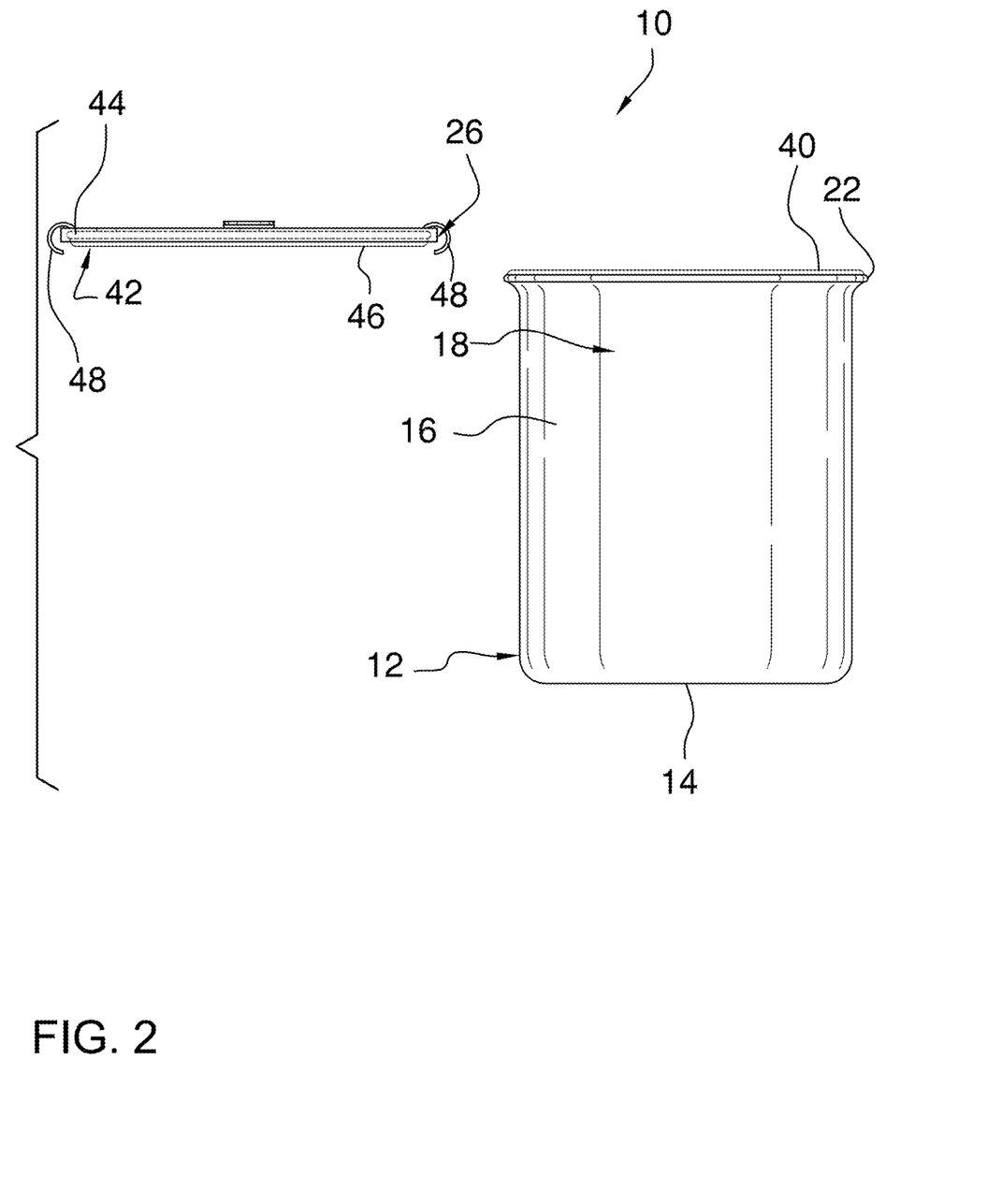
FIG. 2 is a left side view of an embodiment of the disclosure.
Figure 3:
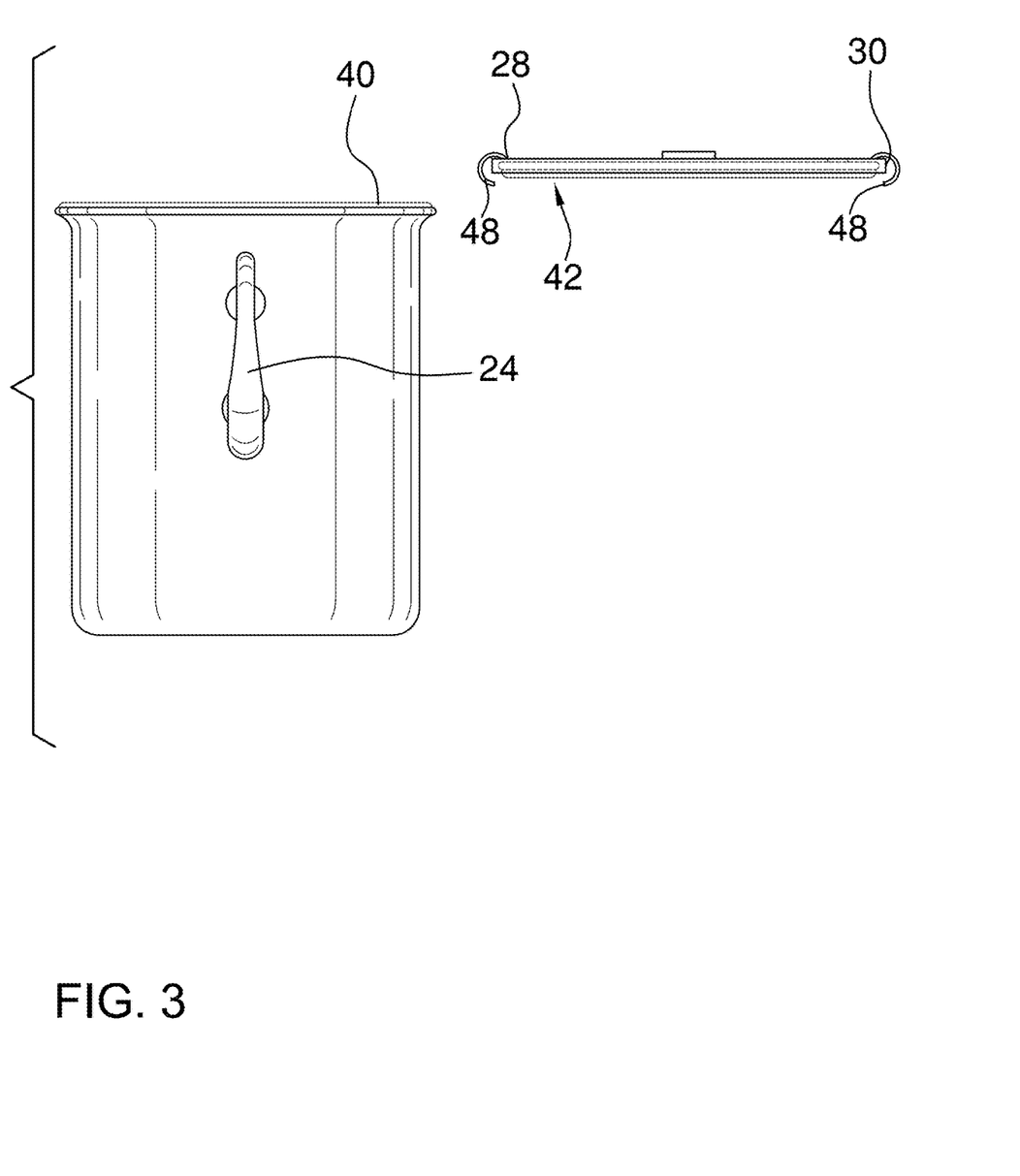
FIG. 3 is a right side view of an embodiment of the disclosure.
Figure 4:
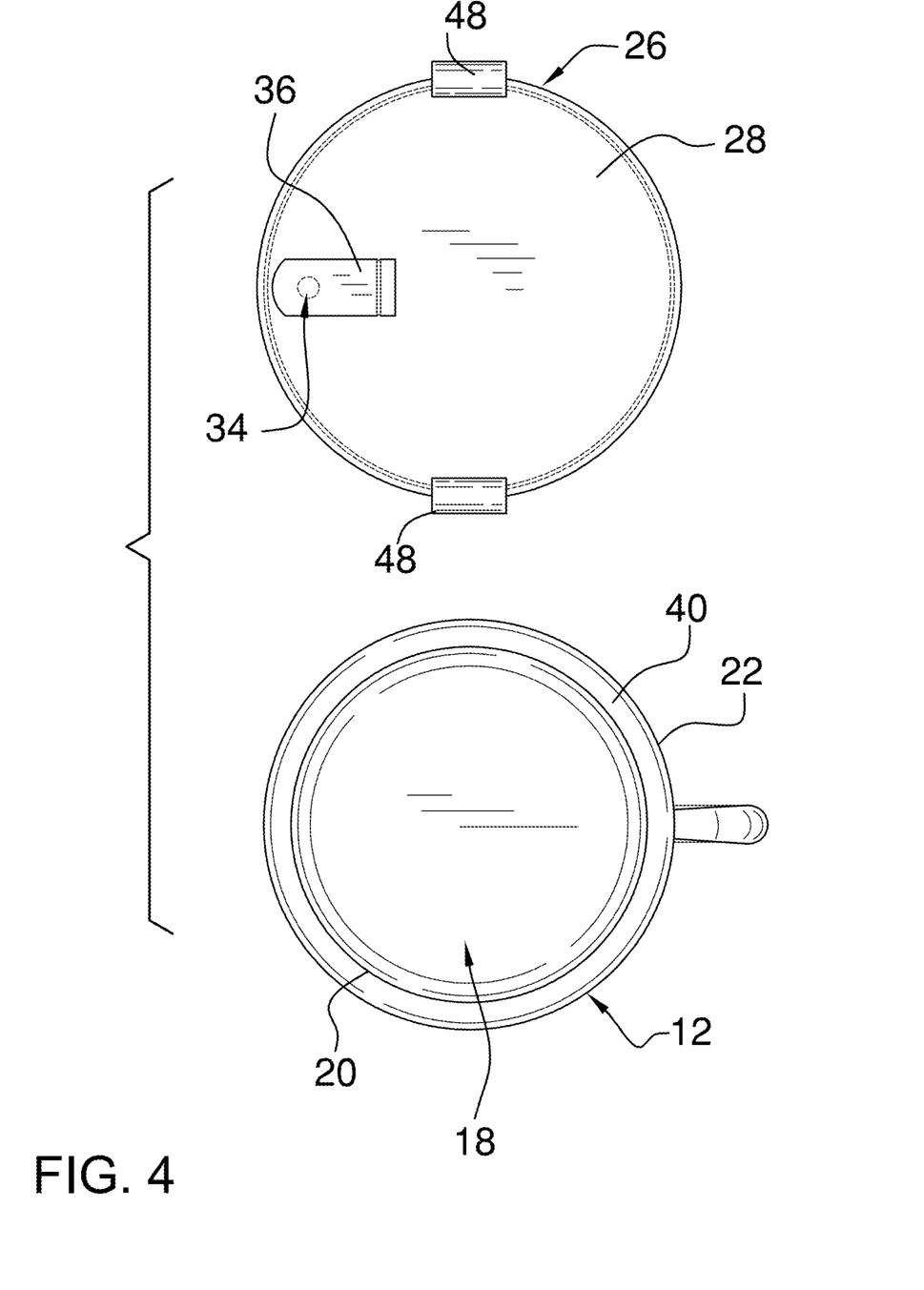
FIG. 4 is a top view of an embodiment of the disclosure.
Figure 5:
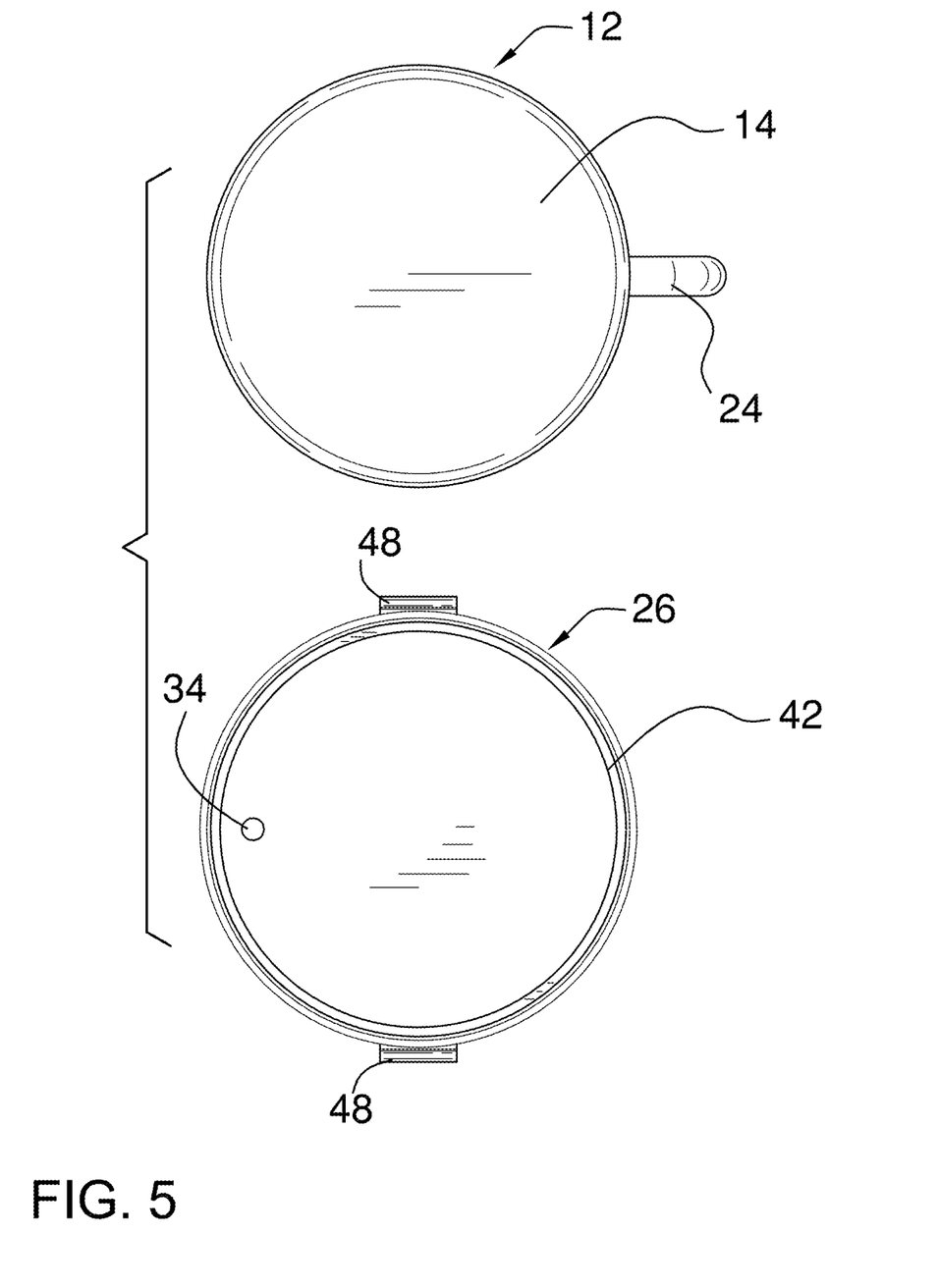
FIG. 5 is a bottom view of an embodiment of the disclosure.
Figure 6:
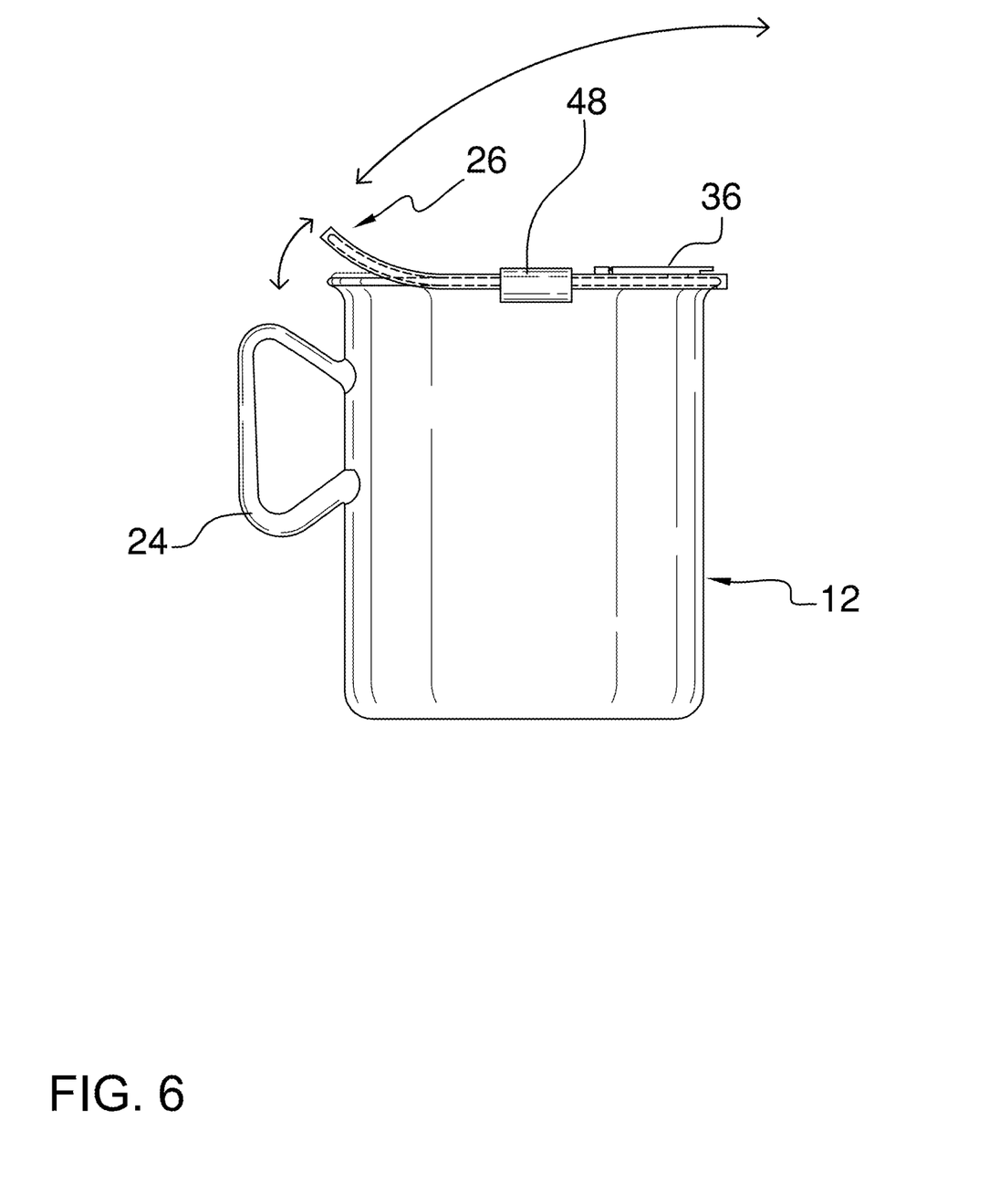
FIG. 6 is an in-use view of an embodiment of the disclosure.

Some embodiments may include a pair of clips 48 that are each pivotably coupled to the upper plate 28. The pair of clips 48 may be aligned with each other across the upper plate 28, for example being positioned on opposing sides of the upper plate 28 as shown in FIGS. 3 and 4. The pair of clips 48 may be spaced from the air vent 34.

Each clip of the pair of clips 48 may extend downwardly from the upper plate 28 past the lip 30 of the lid 26. Each clip of the pair of clips 48 may be downwardly pivotable to engage the rim 22 wherein the pair of clips 48 secure the lid 26 to the mug 12. Each clip of the pair of clips 48 may be upwardly pivotable to release the rim 22 and release the lid 26 from the mug 12. For example, the user may grip the handle 24 to facilitate the user in releasing one or both of the pair of clips 48 so that the user can remove the lid 26 to drink from the mug 12.

A mug gasket 40 may be coupled to the rim 22. The mug gasket 40 may be coextensive with the rim 22. The mug gasket 40 may be positioned over the rim 22. For example, the mug gasket 40 may be centrally positioned on the rim 22.

A lid gasket 42 may be coupled to the lid 26. The lid gasket 42 may be coextensive with the lip 30 of the lid 26. The lid gasket 42 is configured to abut the mug gasket 40 when the lid 26 is positioned over the open top side 20 of the mug 12. For example, the lid gasket 42 may further comprise a ring 44 that is coupled to the upper plate 28. The ring 44 is generally positioned adjacent to the lip 30. A belt 46 may be coupled to and extend downwardly from the ring 44. The belt 46 is generally positioned against the lip 30 of the lid 26.

The mug gasket 40 and the lid gasket 42 may each comprising a rubber material wherein the mug gasket 40 and the lid gasket 42 are configured to seal a junction between the mug 12 and the lid 26 to inhibit airflow into the inner volume 18 and to insulate contents of the mug 12 from outside temperatures. For example, the ring 44 may abut the mug gasket 40 over the rim 22 and the belt 46 may extend downwardly from the ring 44 against rim 22, or the peripheral wall 16, within the mug 12 to seal the junction between the mug 12 and the lid 26.

In use, the inner volume 18 of the mug 12 may be designed to hold between 2.0 and 6.0 shots of espresso. A typical shot of espresso has a volume of about 1.5 fluid ounces. The inner volume 18 may accordingly be between 1.5 fluid ounces and 9.0 fluid ounces. In other embodiments, the inner volume 18 may be increased by around 1.0 fluid ounce to accommodate creamer or milk that may be added to the plurality of espresso shots. The inner volume 18 in such embodiments may be between 2.5 fluid ounces and 10.0 fluid ounces. With the lid 26 positioned over the open top side 20, the espresso mug device 10 may facilitate the user in holding and transporting the plurality of espresso shots without spilling the plurality of espresso shots.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A travel espresso mug assembly comprising:
a mug having a base wall and a peripheral wall being coupled to and extending upwardly from the base wall to define an inner volume, the mug having an open top side to provide access to the inner volume;
a rim being coupled to the peripheral wall distally to the base wall, the rim extending around the open top side;
a lid comprising an upper plate and a lip being coupled to and extending downwardly from the upper plate, the lid being removably positionable over the open top side of the mug to selectively inhibit access to the inner volume wherein the lip is positionable around the rim;
a mug gasket being coupled to the rim;
a lid gasket being coupled to the lid; and
the mug gasket and the lid gasket each comprising a rubber material wherein the mug gasket and the lid gasket are configured to seal a junction between the mug and the lid to inhibit airflow into the inner volume and to insulate contents of the mug from outside temperatures.

2. The travel espresso mug assembly of claim 1, wherein the inner volume is between 2.5 fluid ounces and 10.0 fluid ounces.

3. The travel espresso mug assembly of claim 1, wherein the peripheral wall is curved outwardly approaching the rim wherein the open top side is enlarged to facilitate access into the inner volume.

4. The travel espresso mug assembly of claim 1, further comprising a handle being coupled to the peripheral wall of the mug wherein the handle is configured to facilitate the mug in being held.

5. The travel espresso mug assembly of claim 4, wherein the handle is positioned proximate to the rim.

6. The travel espresso mug assembly of claim 1, wherein the upper plate and the lip of the lid comprise a resiliently deformable material wherein the lid is configured to be upwardly bendable to facilitate removal of the lid from the mug.

7. The travel espresso mug assembly of claim 1, the lid further comprising a clip being pivotably coupled to the upper plate, the clip being downwardly pivotable to engage the rim wherein the clip secures the lid to the mug.

8. The travel espresso mug assembly of claim 1, the lid further comprising an air vent extending through the upper plate wherein the air vent is configured to facilitate airflow out of the inner volume when the air vent is uncovered.

9. The travel espresso mug assembly of claim 8, wherein the air vent is positioned proximate to the lip.

10. The travel espresso mug assembly of claim 8, the lid further comprising a cover being pivotably coupled to the upper plate, the cover being positioned proximate to the air vent, the cover being upwardly pivotable from the upper plate to uncover the air vent, the cover being downwardly pivotable toward the upper plate to close the air vent to inhibit airflow out of the inner volume.

11. The travel espresso mug assembly of claim 10, the cover further comprising a plug being coupled to and extending downwardly from the cover, the plug being alignable with the air vent wherein the plug is positionable within the air vent wherein the plug is configured to inhibit contents of the mug from leaking out of the air vent when the cover is pivoted downwardly to close the air vent.

12. The travel espresso mug assembly of claim 1, wherein the lid gasket is coextensive with the lip of the lid.

13. The travel espresso mug assembly of claim 1, wherein the mug gasket is centrally positioned on the rim.

14. The travel espresso mug assembly of claim 1, wherein the mug gasket is coextensive with the rim.

15. The travel espresso mug assembly of claim 14, wherein the lid gasket is coextensive with the lip of the lid wherein the lid gasket is configured to abut the mug gasket when the lid is positioned over the open top side of the mug.

16. The travel espresso mug assembly of claim 1, the lid gasket further comprising:
   a ring being coupled to the upper plate, the ring being positioned adjacent to the lip; and
   a belt being coupled to and extending downwardly from the ring, the belt being positioned against the lip of the lid.

17. A travel espresso mug assembly comprising:
   a mug having a base wall and a peripheral wall being coupled to and extending upwardly from the base wall to define an inner volume, the mug having an open top side to provide access to the inner volume, the inner volume being between 1.5 fluid ounces and 10.0 fluid ounces wherein the mug is configured to hold a plurality of espresso shots;
   a rim being coupled to the peripheral wall distally to the base wall, the rim extending around the open top side, the peripheral wall being curved outwardly approaching the rim wherein the open top side is enlarged to facilitate access into the inner volume;
   a handle being coupled to and extending outwardly from the peripheral wall of the mug wherein the handle is configured to facilitate the mug in being held, the handle being positioned proximate to the rim;
   a lid comprising an upper plate and a lip being coupled to and extending downwardly from the upper plate, the lid being removably positionable over the open top side of the mug to selectively inhibit access to the inner volume, the lip being positionable around the rim, the upper plate and the lip comprising a resiliently deformable material wherein the lid is configured to be upwardly bendable to facilitate removal of the lid from the mug, the lid further comprising:
      an air vent extending through the upper plate wherein the air vent is configured to facilitate airflow out of the inner volume when the air vent is uncovered, the air vent being positioned proximate to the lip;
      a cover being pivotably coupled to the upper plate, the cover being positioned proximate to the air vent, the cover being upwardly pivotable from the upper plate to uncover the air vent, the cover being downwardly pivotable toward the upper plate to close the air vent to inhibit airflow out of the inner volume, the cover including:
         a plug being coupled to and extending downwardly from the cover, the plug being alignable with the air vent wherein the plug is positionable within the air vent wherein the plug is configured to inhibit contents of the mug from leaking out of the air vent when the cover is pivoted downwardly to close the air vent;
      a pair of clips being pivotably coupled to the upper plate, the pair of clips being aligned with each other across the upper plate, each clip of the pair of clips extending downwardly from the upper plate past the lip, each clip of the pair of clips being downwardly pivotable to engage the rim wherein the pair of clips secure the lid to the mug, each clip of the pair of clips being upwardly pivotable to release the rim wherein the pair of clips release the lid from the mug, the pair of clips being spaced from the air vent;
   a mug gasket being coupled to the rim, the mug gasket being coextensive with the rim, the mug gasket being positioned over the rim, the mug gasket being centrally positioned on the rim;
   a lid gasket being coupled to the lid, the lid gasket being coextensive with the lip of the lid wherein the lid gasket is configured to abut the mug gasket when the lid is positioned over the open top side of the mug, the lid gasket further comprising:
      a ring being coupled to the upper plate, the ring being positioned adjacent to the lip;
      a belt being coupled to and extending downwardly from the ring, the belt being positioned against the lip of the lid; and
   the mug gasket and the lid gasket each comprising a rubber material wherein the mug gasket and the lid gasket are configured to seal a junction between the mug and the lid to inhibit airflow into the inner volume and to insulate contents of the mug from outside temperatures.

\* \* \* \* \*